United States Patent [19]

Fujimura et al.

[11] Patent Number: 5,396,423
[45] Date of Patent: Mar. 7, 1995

[54] AUTOMOTIVE ACTIVE SUSPENSION SYSTEM FOR REGULATING VEHICULAR HEIGHT LEVEL DURING ANTI-ROLLING CONTROL

[75] Inventors: Itaru Fujimura; Naoto Fukushima; Yohsuke Akatsu; Masaharu Sato; Kensuke Fukuyama, all of Kanagawa, Japan

[73] Assignee: Nissan Motor Co., Ltd., Yokohama, Japan

[21] Appl. No.: 882,274

[22] Filed: Jan. 21, 1992

[30] Foreign Application Priority Data

Jan. 22, 1991 [JP] Japan .................................. 3-005722
Nov. 6, 1991 [JP] Japan .................................. 3-290088

[51] Int. Cl.$^6$ ............................................. B60G 11/26
[52] U.S. Cl. .................................. 364/424.05; 280/707
[58] Field of Search .................... 364/424.05; 280/840, 280/6.1, 6.12, 707, DIG. 1

[56] References Cited

U.S. PATENT DOCUMENTS

| | | | |
|---|---|---|---|
| 4,852,906 | 8/1989 | Buma et al. | 280/707 |
| 4,948,164 | 8/1990 | Hano et al. | 280/707 |
| 4,967,360 | 10/1990 | Fukunaga et al. | 364/424.05 |
| 5,058,017 | 10/1991 | Adachi et al. | 364/424.05 |
| 5,080,391 | 1/1992 | Kawabata | 280/707 |
| 5,083,811 | 1/1992 | Sato et al. | 280/707 |
| 5,088,762 | 2/1992 | Fukuyama et al. | 280/707 |
| 5,103,397 | 4/1992 | Ikemoto et al. | 364/424.05 |
| 5,144,558 | 9/1992 | Fukushima et al. | 364/424.05 |
| 5,162,995 | 11/1992 | Ikemoto et al. | 364/424.05 |
| 5,177,681 | 1/1993 | Sato | 364/424.05 |

FOREIGN PATENT DOCUMENTS

62-295714 12/1987 Japan .

Primary Examiner—Vincent N. Trans
Assistant Examiner—Collin W. Park
Attorney, Agent, or Firm—Lowe, Price, LeBlanc & Becker

[57] ABSTRACT

An active suspension system is provided which includes hydraulic cylinders for suppressing rolling motion of a vehicle body. The system is responsive to lateral acceleration acting on the vehicle body to provide a control signal for supplying hydraulic pressure to the cylinders for anti-rolling control. The control signal includes first and second pressure control signals. The first pressure control signal commands supply of hydraulic pressure for providing an anti-rolling moment, while the second pressure control signal commands supply of hydraulic pressure for supporting a portion of the static load of the vehicle body to maintain the vehicle body at a target height level. The system is further responsive to increase in lateral acceleration to modify the second pressure control signal to reduce the hydraulic pressure for supporting the portion of static load, thereby compensating for forces acting to raise the vehicle body caused by the anti-rolling control for establishing a constant vehicular height level irrespective of variation in the lateral acceleration acting on the vehicle body.

8 Claims, 9 Drawing Sheets

FRONT WHEEL

REAR WHEEL

FRONT WHEEL

AUTOMOTIVE ACTIVE SUSPENSION SYSTEM FOR REGULATING VEHICULAR HEIGHT LEVEL DURING ANTI-ROLLING CONTROL

BACKGROUND OF THE INVENTION

Field of The Invention

The present invention relates generally to an active suspension control system for a vehicle for suppressing vehicular rolling motion caused by lateral acceleration acting on a vehicle body. More specifically, the invention relates to an active suspension control system which is operable to adjust a vehicular height level during anti-rolling motion control.

Description of The Background Art

Japanese Patent First Publication No. 62-295714, which corresponds to the U.S. application No. 07/657,946, discloses an active suspension control system for a vehicle. This prior art suspension control system includes generally hydraulic cylinders disposed between suspension members and a vehicle body and coil springs arranged parallel thereto so that internal pressures of the hydraulic cylinders are maintained at a preselected neutral pressure when no vehicular rolling motion occurs to provide thrusts required for supporting a portion of static load of a vehicle. When the vehicle is turned to cause rolling motion to occur, the system detects lateral acceleration acting on the vehicle body to raise the pressures in the hydraulic cylinders for the outside wheels with the pressures in the hydraulic cylinders for the inside wheels being reduced, based on an amount of the detected lateral acceleration, for generating an anti-rolling moment which compensates a rolling moment caused by lateral vehicular load shift created proportional to the lateral acceleration acting on the vehicle body.

Referring to FIG. 1, a three-link model is shown which shows a vehicle body and right and left suspensions by way of explaining forces acting on a vehicle body from a road surface during turning in the above-described conventional active suspension system.

On a surface of a tire contacting with a road surface, force is created to bear lateral displacement of the vehicle body to be balanced with centrifugal force. From this contact surface, reaction force or cornering force is generated in a direction of the rolling motion center. A vertical component of the reaction force against an outside wheel during turning acts as a jack-up force $W_U$, raising the vehicle body, while a vertical component at an inside wheel acts as a jack-down force $W_D$, lowering the vehicle body. During turning, due to lateral load shift of the vehicle body, a vertical load acting on the outside wheel is increased while a vertical load acting on the inside wheel is decreased with the result that a cornering force $C_{FO}$, created on the outside wheel, becomes greater than cornering force $C_{FI}$, created on the inside wheel. Consequently, if the rolling motion center is, as shown in the drawing, positioned above the road contact point of the tires, and the link angles of the left and right links are substantially maintained at the same values caused by anti-rolling control, the jack-up force $W_U$ becomes greater than the jack-down force $W_D$. The resultant additional jack-up force then acts to raise the vehicle body. This vehicle body raising force is increased according to increase in lateral acceleration during turning. It will be noted that due to the above mentioned jack-up force raising a vehicular height level during turns, a stroke of an outside wheel suspension becomes greater than a desired value to vary a camber and/or toe angle. Additionally, when a vehicle travels on an uneven road, the outside wheel suspension is extended completely to degrade the gripping ability of a tire. When the vehicle is turned at a high speed and great lateral acceleration acts on the vehicle, the vehicle body rises further to also degrade gripping of a tire of the inside wheel. This results in driving instability.

For avoiding the above drawbacks, improving link arrangements of a typical mechanical suspension may be proposed to move the rolling motion center downward in a turning inside direction according to rolling motion of a vehicle body. However, an active suspension system suppresses vehicular rolling motion practically, therefore, shifting the rolling-motion center to prevent the vehicle body from rising is not practically accomplishable in such systems.

SUMMARY OF THE INVENTION

It is therefore a principal object of the present invention to avoid the disadvantages of the prior art.

It is another object of the invention to provide an active suspension control system which serves to compensate a force raising a vehicle body, caused by anti-rolling motion control during turning, for establishing suitable driving stability.

According to one aspect of the present invention, there is provided an active suspension system for a vehicle comprising: suspension units including actuators disposed between a vehicle body and suspension members which respectively support wheels rotatably, each actuator being adjustable of fluid pressure therein for active suspension control; a pressure source which supplies fluid pressure to the actuators of the suspension units; pressure control means for controlling the fluid pressure supplied from the pressure source to the actuators of the suspension units respectively; sensor means for detecting lateral acceleration acting on the vehicle body to provide a signal indicative thereof; and control means responsive to the signal from the sensor means to provide a control signal to the pressure control means which includes first and second pressure control signals, the first pressure control signal commanding the pressure control means to provide first fluid pressure for suppressing rolling motion caused by the lateral acceleration acting on the vehicle body, the second pressure control signal commanding the pressure control means to provide second fluid pressure for establishing a preselected vehicular height level, the control means being responsive to increase in the lateral acceleration detected by the sensor means to correct the second control signal for reducing the second fluid pressure by a preselected rate.

According to another aspect of the present invention, there is provided an active suspension system for a vehicle comprising: suspension units including actuators disposed between a vehicle body and suspension members which respectively support wheels rotatably, each actuator being adjustable of fluid pressure therein for active suspension control; a pressure source which supplies fluid pressure to the actuators of the suspension units; pressure control means for controlling the fluid pressure supplied from the pressure source to the actuators of the suspension units respectively; sensor means for detecting lateral acceleration acting on the vehicle body to provide a signal indicative thereof; and control means responsive to the signal from the sensor means to provide a control signal to the pressure control means to vary the fluid pressure to the actuators by a preselected rate according to variation in the lateral acceleration acting on the vehicle body for providing anti-rolling moment, the control means being further responsive to increase in the lateral acceleration to correct the control signal so as to reduce the hydraulic pressure to the actuators for compensating for forces caused by the lateral acceleration acting on the vehicle body to cause the vehicle body to rise above a preselected height level to maintain the vehicle body at the preselected height level.

DESCRIPTION OF THE PREFERRED EMBODIMENT

Figure 1:
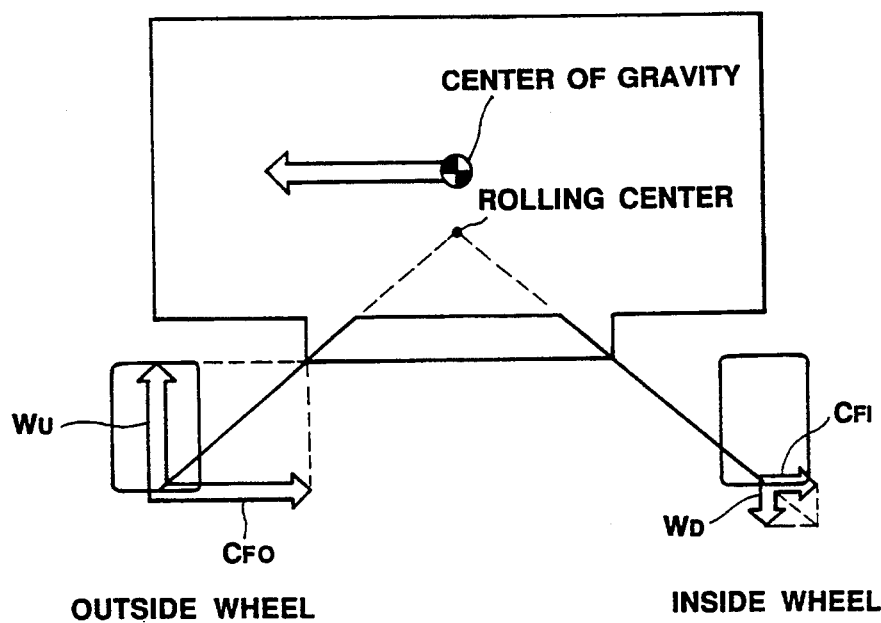
FIG. 1 is an illustration which shows a three-link model by way of explaining forces from a road surface acting on a vehicle body during turning.
Figure 2:
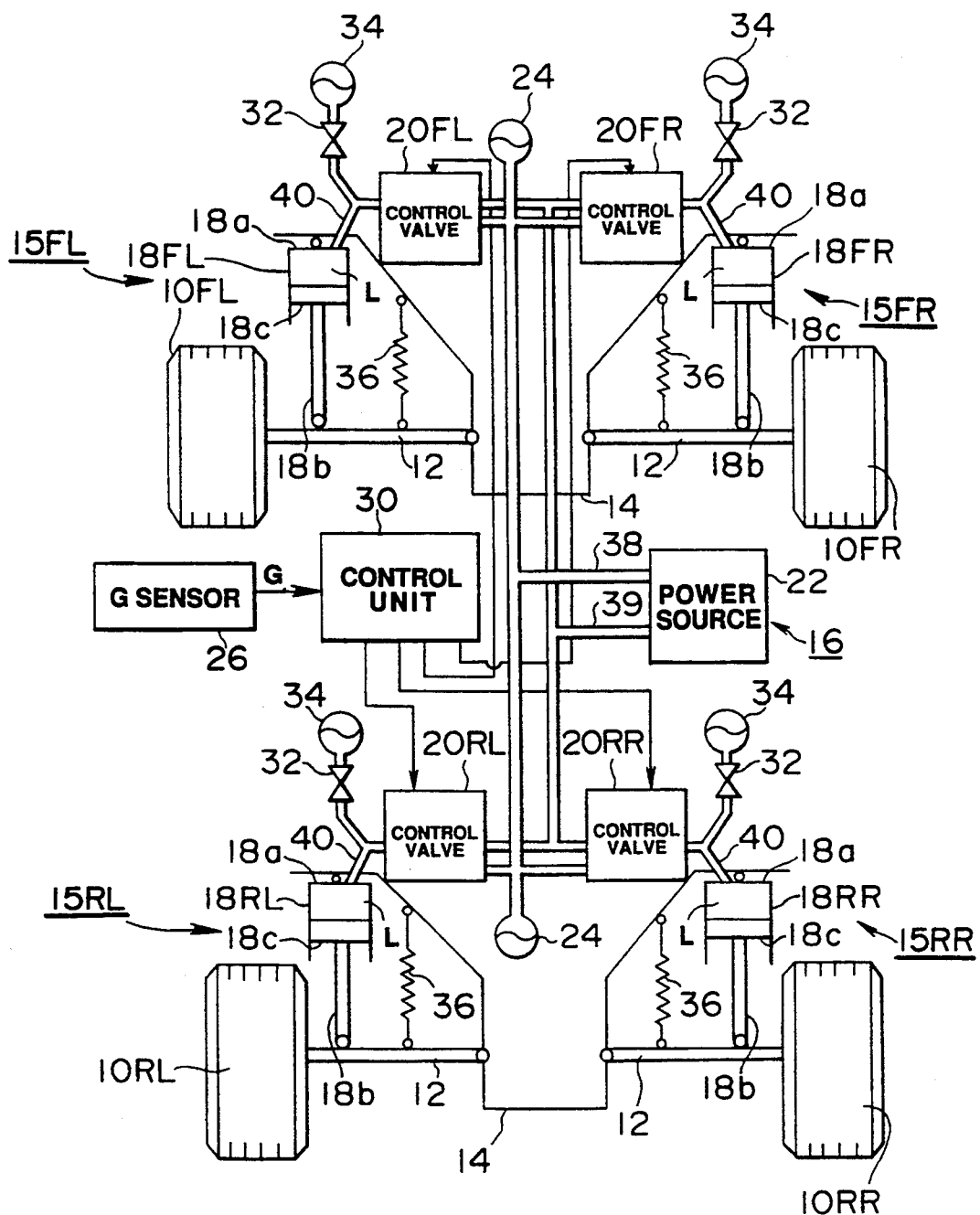
FIG. 2 is a schematic view which shows an active suspension system according to the present invention.

Referring now to the drawings, particularly to FIG. 1, an active suspension system 16 for a vehicle according to the present invention is shown. This system is operable to effect suspension control for regulating a vehicle height level and vehicle attitude change by suppressing relative displacements between a vehicle body 14 and suspension members 12 respectively which support front-left, front-right, rear-left, and rear-right wheels 10FL, 10FR, 10RL, and 10RR.

The active suspension system 16 includes generally four suspension units 15FL, 15FR, 15RL, and 15RR for the corresponding wheels. The suspension units include working fluid cylinders 18FL to 18RR such as a hydraulic cylinder, functioning as an actuator, disposed between the suspension members 12 and the vehicle body 14, coil springs 36 arranged parallel to the hydraulic cylinders, and pressure control valves 20FL to 20RR which serve to adjust hydraulic pressure supplied to the hydraulic cylinders 18FL to 18RR respectively. The coil springs 36 have a relatively low spring constant for bearing a portion of static load of the vehicle body 14.

The active suspension system 16 further includes a pressure source 22, two accumulators 24, a lateral acceleration sensor 26, and a control unit 30. The accumulators 24 are arranged between the pressure source 22 and the front pressure control valves 20FL and 20FR and the rear pressure control valves 20RL and 20RR respectively for accumulating hydraulic pressure from the pressure source 22. The lateral acceleration sensor 26 monitors lateral acceleration acting on the vehicle body 14 to provide a signal indicative thereof to the control unit 30. The control unit 30 is then responsive to the signal from the lateral acceleration sensor 26 to modify hydraulic pressure output from the pressure control valves 20FL-to 20RR to the hydraulic cylinders 18FL to 18RR independently for controlling rolling motion of the vehicle body 14.

The suspension units 15FL to 15RR further include throttles, or orifices 32 communicating with pressure chambers L, as will be described hereinafter in detail, of the hydraulic cylinders 18FL to 18RR and accumulators 34 for absorbing vibration having a relatively high frequency transmitted from the wheels respectively.

Each of the hydraulic cylinders 18FL to 18RR includes a cylinder tube 18a which defines an upper pressure chamber L closed by a piston 18c. An upper portion of the cylinder tube 18a is attached to the vehicle body 14, while a lower portion of a piston rod 18b is attached to the suspension member 12.

Each of the pressure control valves 20FL to 20RR is designed as a three-port proportional electromagnetic pressure reducing valve which includes supply, return, and output ports. For example, U.S. Pat. No. 4,967,360, issued on Oct. 30, 1990 and assigned to the applicant common to the present invention, discloses a valve of this type, disclosure of which is incorporated herein by reference. The pressure control valve includes a valve housing having a cylindrical valve bore in which a valve spool is slidably disposed and a proportional solenoid installed in the valve housing. The supply and return ports are communicated with hydraulic pressure supply and return ports of the pressure source 22 through hydraulic lines 38 and 39 respectively for supply and return hydraulic pressure to and from the pressure control valve, while the output port is communicated with the pressure chamber L of the hydraulic cylinder through a hydraulic line 40.

With these arrangements, adjustment of a command, or exciting, current i applied to the solenoid causes a displacement of the valve spool to be controlled, thereby causing control pressure $P_C$, to be output from the output port of the pressure control valve 20FL (-20RR) to the pressure chamber L of the hydraulic cylinder 18FL (-18RR), to be controlled according to the magnitude of the exciting current i.

Figure 3:
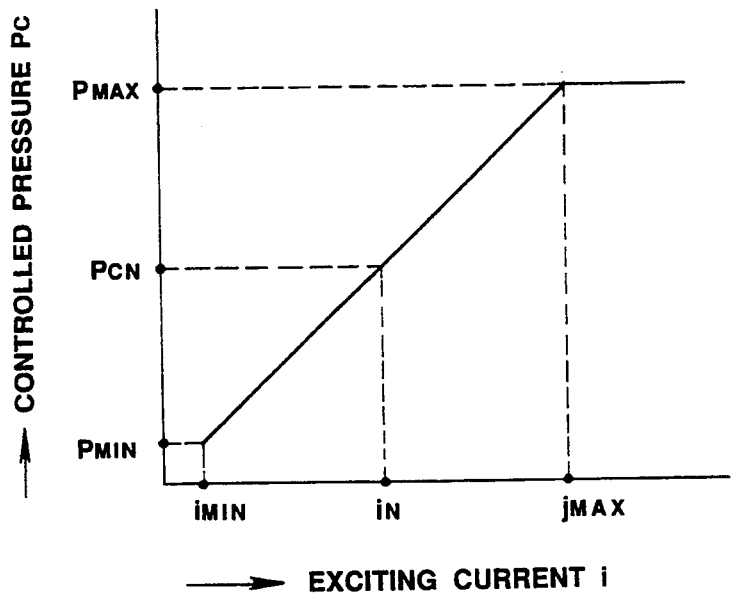
FIG. 3 is a graph which shows the relationship between output pressure of a pressure control valve and current applied thereto.

Referring to FIG. 3, the relationship between the exciting current i and controlled pressure $P_C$ is shown.

When the exciting current i is approximately zero, the pressure control valve provides a minimum control pressure $P_{MIN}$. As the exciting current is positively increased from this level, the control pressure $P_C$ becomes great proportionally with a preselected gain $K_1$ and is then saturated at a maximum set pressure $P_{MAX}$ of the hydraulic pressure source 22. Additionally, when the exciting current of $i_N$ is provided according to a neutral pressure command value $VN_0$ as will be described hereinafter in detail, the pressure control valve outputs neutral pressure $P_{CN}$.

Figure 4:
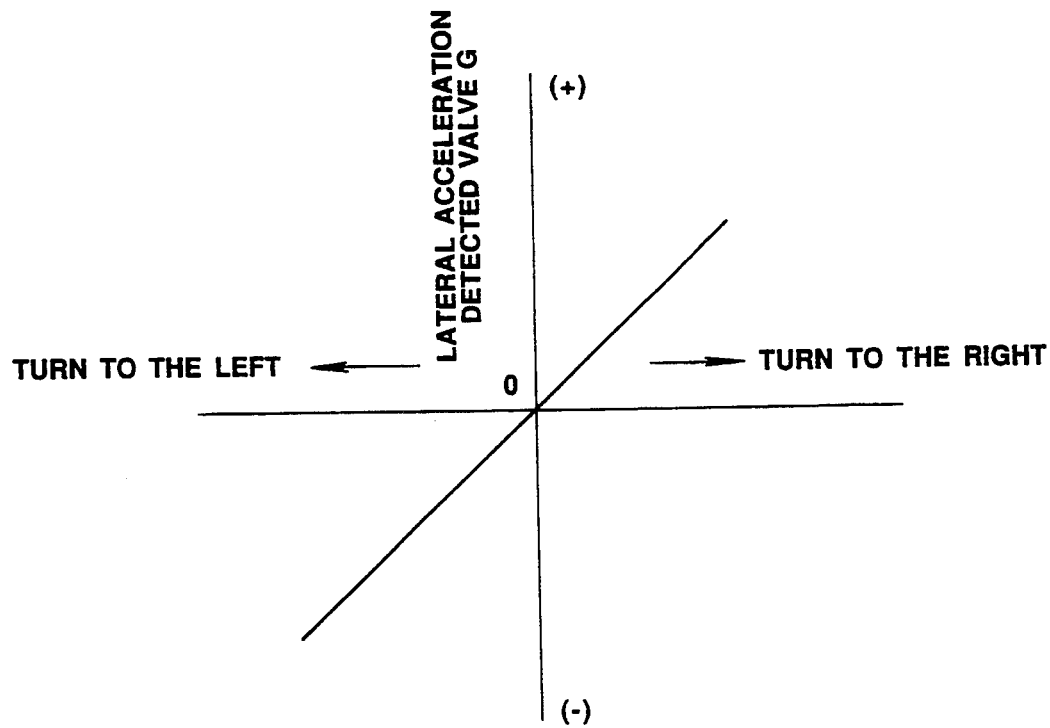
FIG. 4 is a graph which shows the relationship between lateral acceleration acting on a vehicle body and a value of detected lateral acceleration.

Referring to FIG. 4, the relationship between lateral acceleration acting on the vehicle body 14 and a value G of lateral acceleration detected-by the lateral acceleration sensor 26 is shown. When a vehicle is turned to the right, the lateral acceleration sensor provides a signal indicative of a lateral acceleration detected value G having a positive voltage proportional to lateral acceleration acting on the vehicle body, while when the vehicle is turned to the left, a signal having a negative voltage is provided.

Figure 5:
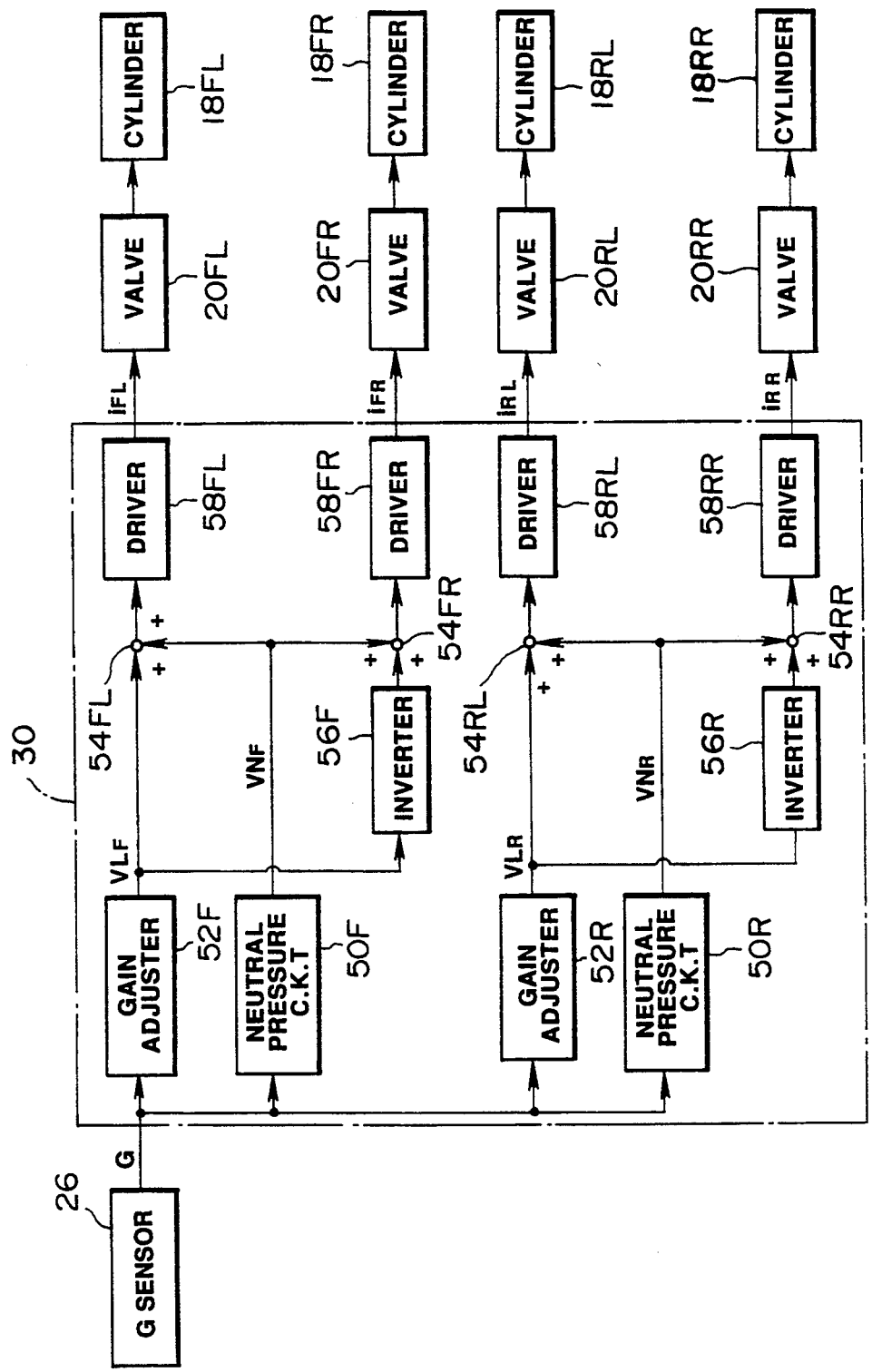
FIG. 5 is a block diagram which shows a control unit of an active suspension system of the invention.

Referring to FIG. 5, the control unit 30 includes generally neutral pressure setting circuits and 50R, variably adjusting gain circuits for the front and rear suspension units 52F and 52R, adder circuits 54FL, 54RL, 54FR, and 54RR, and driving circuits 58FL to 58RR.

The neutral pressure setting circuits 50F and 50R are responsive to a signal indicative of a lateral acceleration detected value G from the lateral acceleration sensor 26 to provide neutral pressure command values $VN_F$ and $VN_R$ having voltage according to the lateral acceleration detected value. The variably adjusting gain circuits 52F and 53R are also responsive to the signal from the lateral acceleration sensor 26 to multiply the lateral acceleration detected value G by anti-rolling control gains $K_F$ and $K_R$ for the front and rear suspension units to provide anti-rolling command values $VL_F$ and $VL_R$ respectively. These anti-rolling command values $VL_F$ and $VL_R$ are then respectively inputted to one of input ports of the adder circuits 54FL and 54RL directly while, at the other input ports of the adder circuits 54FL and 54FR, the neutral pressure command values $VN_F$ and $VN_R$ from the neutral pressure setting circuits 50F and 5OR, are input. Additionally, the anti-rolling command values $VL_F$ and $VL_R$ are further input to one of input ports of the adder circuits 54FR and 54RR with reversed polarities, converted by inverters 56F and 56R respectively, while to the other input ports, the neutral pressure command values $VN_F$ and $VN_R$ from the neutral pressure setting circuits 50F and 50R are input. The adder circuits 54FL to 54RR output the added command values to the driver circuits 58FL to 58RR respectively. The driver circuits 58FL to 58RR are designed as a floating type constant-voltage circuit for example which provide exciting currents $i_{FL}$ to $i_{RR}$ to the proportional solenoids of the pressure control valves 20FL to 20RR according to the added command values respectively.

The neutral pressure setting circuits 50F and 50R provide neutral pressure command value correcting means respectively which may include a function generator operable to output the neutral pressure command values $VN_F$ and $VN_R$ according to the lateral acceleration detected value G.

The above control unit 30 may be provided with a micro-computer which operates arithmetically.

Figure 6:
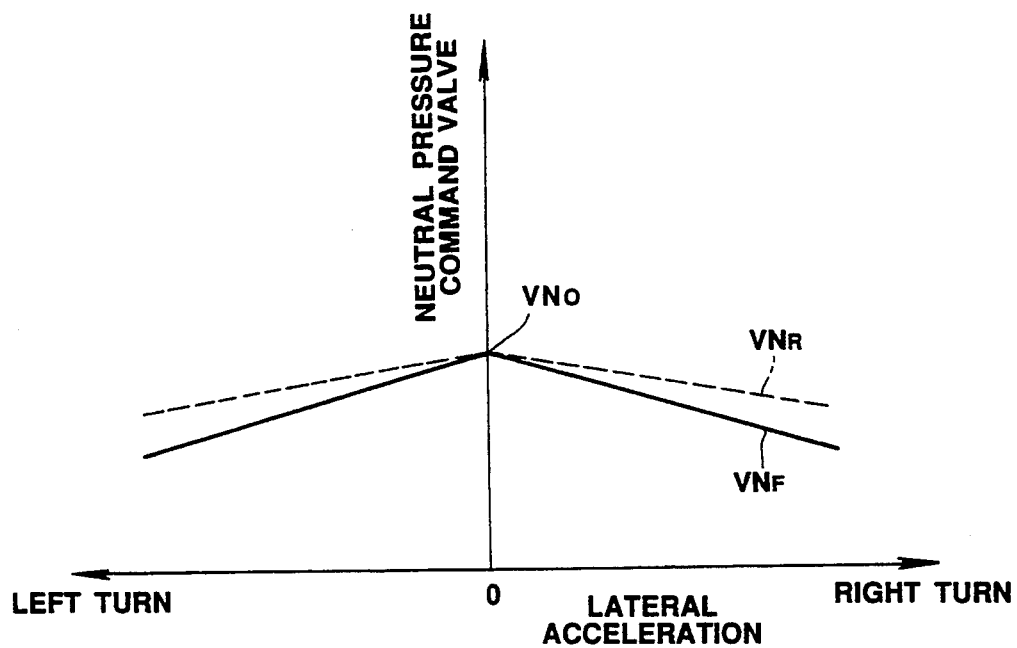
FIG. 6 is a graph which shows the relationship between detected lateral acceleration acting on a vehicle body and an output value of a neutral pressure setting circuit of an active suspension system according to the invention.

Referring to FIG. 6, there is shown the relationship between lateral acceleration acting on the vehicle body and signal values output from the neutral pressure setting circuits 50F and 50R. The neutral pressure setting circuit 50F for the front suspension units is responsive to the lateral acceleration detected value G of zero to provide a preselected positive value $VN_0$ for supporting part of a static load of the vehicle body. As the lateral acceleration detecting value G is positively or negatively varied from this level, the neutral pressure command value $VN_F$ is outputted which is decreased gradually by a first preselected rate as shown by a solid line in the drawing. Additionally, the neutral pressure setting circuit 50R for the rear suspension units outputs the same preselected positive value $VN_0$ as that of the neutral pressure setting circuit 50F for supporting part of the static load of the vehicle body when the lateral acceleration detected value G is zero. As the lateral acceleration detected value G is positively or negatively varied from this level, the neutral pressure command value $VN_R$ is output which is decreased gradually by a second preselected rate smaller than the first preselected rate as shown by a broken line. In other words, the neutral pressure setting circuit 50F for the front suspension units is responsive to increase of lateral acceleration acting on the vehicle body to provide the neutral pressure command value $VN_F$, which is smaller than the value $VN_R$, for the rear suspension units.

A total gain K ($=K_F+K_R$) of the gains $K_F$ and $K_R$ of the varlably adjusting gain circuits 52F and 52R for the front and rear suspension units is provided to establish vehicle rolling motion of about zero while lateral acceleration acts on the vehicle body. Additionally, the gain $K_F$ is set to a value greater than that of the gain $K_R$ ($K_F>K_R$) in this embodiment. Thus, a lateral load displacement between the front left and right wheels caused by anti-rolling control when lateral acceleration acts on the vehicle body becomes great relative to a lateral load displacement between the rear left and right wheels so that vehicle steering characteristics is set in an understeering direction.

The driving circuits 58FL to 58RR output exciting currents i determined based on values output from the adder circuits 54FL to 54RR to the pressure control valves 20FL to 20RR respectively for adjusting hydraulic pressure supplied to the hydraulic cylinders 18FL to 18RR.

In operation, assuming that a vehicle is traveling straight at a constant speed on an even road without any protrusions, the lateral acceleration sensor 26 provides a signal representing the lateral acceleration detected value G of zero which indicates no lateral acceleration acting on the vehicle body. The neutral pressure setting circuits 50F and 50R of the control unit 30 are then responsive to the signal from the lateral acceleration sensor 26 to provide the neutral pressure command values $VN_F$ and $VN_R$ indicative of the preselected positive value $VN_0$ respectively as shown in FIG. 6. In addition, the variably adjusting gain circuits 52F and 52R provide the anti-rolling pressure command values $VL_F$ and $VL_R$ with a value of zero respectively. Thus, all the adder circuits 54FL to 54RR output the preselected value $VN_0$ as a result of adding to the driving circuits 58FL to 58RR. The driving circuits 58FL to 58RR then output exciting currents 1FL to 1RR as the neutral pressure command current $i_N$ as shown in FIG. 3. The pressure control valves 20FL to 20RR are then responsive to the neutral pressure command currents $i_N$ respectively to output the controlled pressure $P_C$ indicating the neutral pressure $P_{CN}$. Internal pressures of the hydraulic cylinders 18FL to 18RR are also modified to the neutral pressure $P_{CN}$, thereby maintaining the vehicle body on a level orientation at a target vehicle height.

When the vehicle is turned from a straight traveling status, the vehicle body tends to roll and the lateral acceleration sensor 26 detects lateral acceleration acting on the vehicle body to provide a signal indicating a lateral acceleration detected value G, having a positive or negative level, to the control unit 30. The neutral pressure setting circuits 50F and 50R of the control unit 30 then decrease the neutral pressure command values $VN_F$ and $VN_R$ output therefrom respectively by different rates, as described above, according to an increase in the lateral acceleration detected value G.

Additionally, the variably adjusting gain circuits 52F and 52R for the front and rear suspension units are responsive to the signal from the lateral acceleration sensor 26 to multiply the lateral acceleration detected value G by the anti-rolling control gains $K_F$ and $K_R$ and then provide the anti-rolling command values $VL_F$ and $VL_R$.

Accordingly, if the vehicle is now turned to the right, the lateral acceleration detected value G represents a positive level. The adder circuit FL, therefore, adds the positive anti-rolling control command value $VL_F$ to the positive neutral pressure command value $VN_F$ to provide a value which is greater than the value $VN_F$ by the value $VL_F$. In contrast, the adder circuits 54FR provides a value which is smaller than the neutral pressure command value $VN_F$ by the anti-rolling control command value $VL_F$ since the $VL_F$ supplied to the adder circuit 54FR is inverted in polarity by the inverter 56F. Similarly, the adder circuit 54RL provides a value which is greater than the neutral pressure command value $VN_R$ by the anti-rolling control command value $VL_R$, while the adder circuit 54RR provides a value which is smaller than the neutral pressure command value $VN_R$ by the anti-rolling control command value $VL_R$. With these values output from the adder circuits, the pressure control valves 20FL and 20RL respectively output a controlled pressure $P_C$, greater than the neutral pressure $P_{CN}$, to the hydraulic cylinders 18FL and 18RL for the front left and rear left wheels (the outside wheels during right turning), causing pressures therein to be elevated to provide thrusts against vehicular rolling motion. The pressure control valves 20FR and 20RR respectively output a controlled pressure $P_C$ smaller than the neutral pressure $P_{CN}$ to the hydraulic cylinders 18FR and 18RR for the front right and rear right wheels (the inside wheels during right turning), causing pressures therein to be reduced to provide thrusts which do not promote the rolling motion. This results in the vehicle body being maintained at a flat, level orientation.

Figure 7:
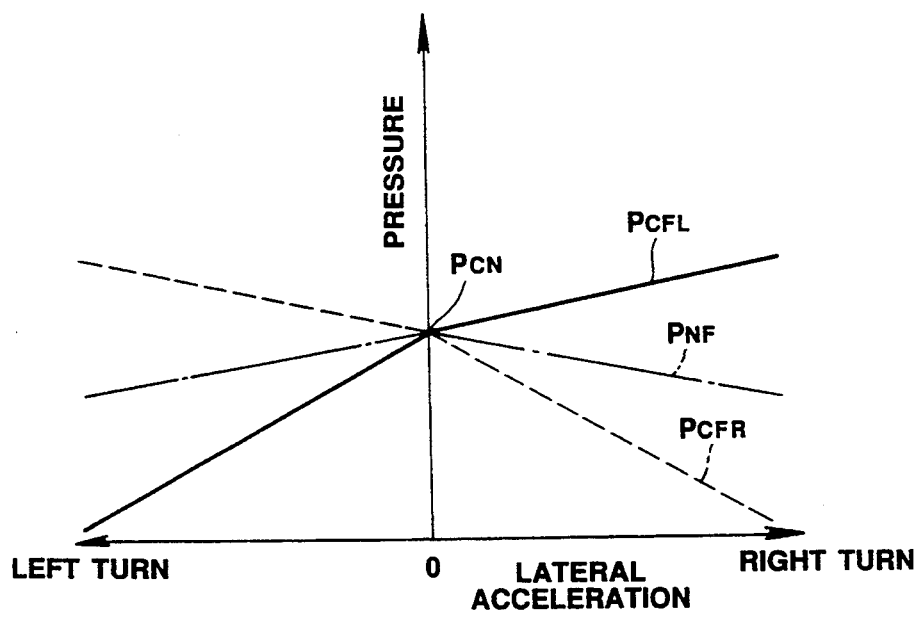
FIG. 7 is a graph which shows the relationship between detected lateral acceleration acting on a vehicle body and pressure created in a hydraulic cylinder for a front wheel.
Figure 8:
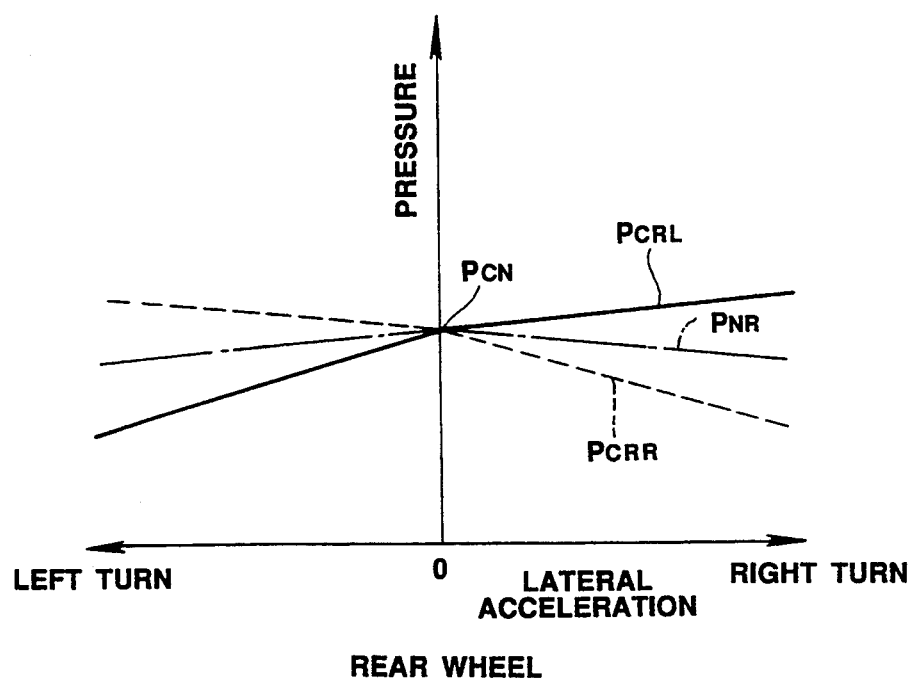
FIG. 8 is a graph which shows the relationship between detected lateral acceleration acting on a vehicle body and pressure created in a hydraulic cylinder for a rear wheel.

The neutral pressure command values $VN_F$ and $VN_R$ output from the neutral pressure setting circuits 50F and 50R, as previously mentioned, are decreased according to increase in the lateral acceleration detecting value G, therefore, the neutral pressures $P_{NF}$ and $P_{NR}$ corresponding to the values $VN_F$ and $VN_R$ are also reduced as shown in FIGS. 7 and 8. Thus, the controlled pressure $P_{CFL}$ increased by the pressure control valve 20FL for the front outside wheel and the controlled pressure $P_{CFR}$ decreased by the pressure control valve 20FR for the front inside wheel vary, as indicated by solid and broken lines in FIG. 7, according to the variation in the neutral pressure $P_{NF}$ in opposite directions by the same amount (this amount, as mentioned above, corresponds to the anti-rolling pressure command value $VL_F$) with respect to a value of the neutral pressure $P_{NF}$. In control for the rear suspension units, the neutral pressure $P_{NR}$ varies by a rate smaller than that of the neutral pressure $P_{NF}$ for the front suspension units as shown in FIG. 8. Thus, the controlled pressure $P_{CRL}$ increased by the pressure control valve 20RL for the rear outside wheel and the controlled pressure $P_{CRR}$ decreased by the pressure control valve 20RR for the rear inside wheel vary, as indicated by solid and broken lines in the drawings, according to the variation in the neutral pressure $P_{NR}$ by rates smaller than those of the $P_{CFL}$ and $P_{CFR}$.

It will be appreciated that the average pressure of the left and right hydraulic cylinders (corresponding to the neutral pressure) is decreased according to increase in lateral acceleration acting on the vehicle body, thereby reducing thrusts provided by the hydraulic cylinders 18FL to 18RR for supporting part of a static load of the vehicle body to compensate for the increased jack-up force $W_U$ as mentioned previously. Therefore, vehicular rolling motion is suitably suppressed and height of the center of gravity of the vehicle body is maintained at a preselected constant level during turning, irrespective of variation in lateral acceleration acting on the vehicle body.

Figure 9:
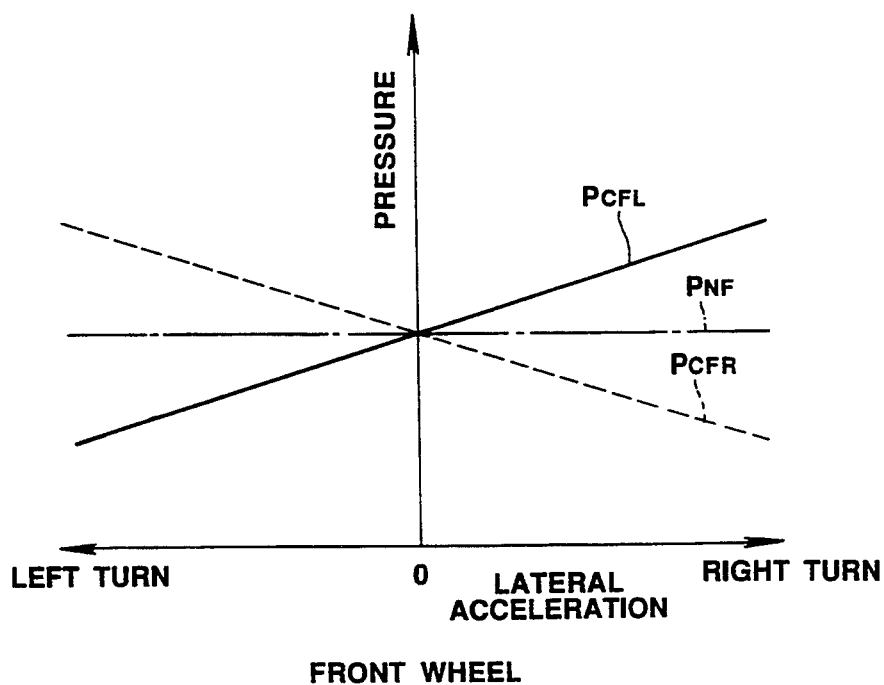
FIG. 9 is a graph which shows the relationship between detected lateral acceleration acting on a vehicle body and pressure created in a hydraulic cylinder for a front wheel in a conventional active suspension system.
Figure 10:
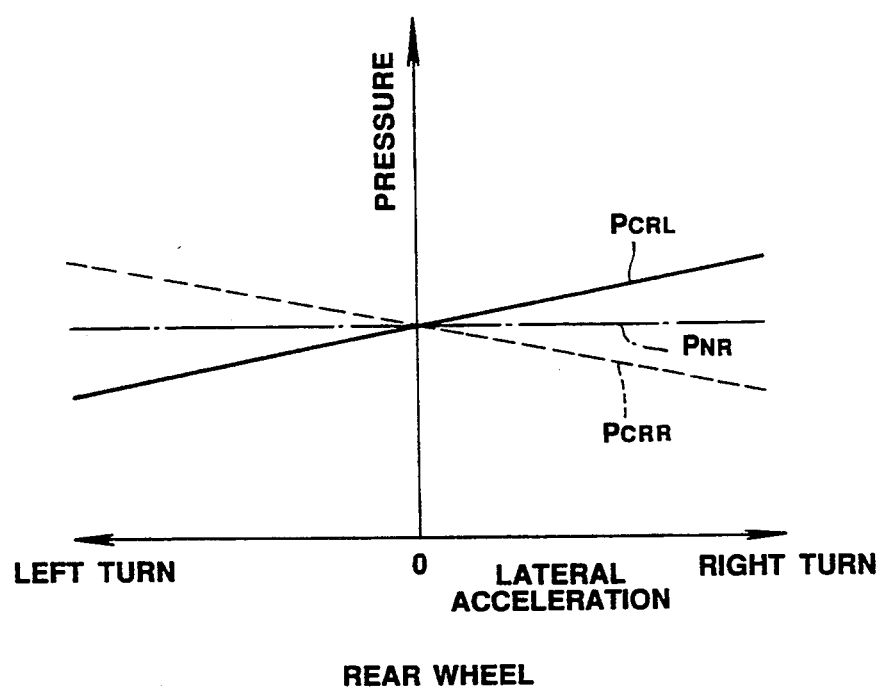
FIG. 10 is a graph which shows the relationship between detected lateral acceleration acting on a vehicle body and pressure created in a hydraulic cylinder for a rear wheel in a conventional active suspension system.

Referring to FIGS. 9 and 10, by way of explaining a prior art system, since the prior art system maintains the neutral pressure $P_{CN}$ at a constant level regardless of variation in lateral acceleration acting on a vehicle body, output pressures $P_{CFL}$ and $P_{CRL}$ for the left wheels from the hydraulic cylinders 18FL and 18RL and output pressures $P_{CFR}$ and $P_{CRR}$ for the right wheels from the hydraulic cylinders 18FR and 18RR, vary by the same rates respectively with respect to the neutral pressures $P_{NF}$ and $P_{NR}$ dependent upon variation in the anti-rolling control gains $K_F$ and $K_R$ for the front and rear suspension units. With this control, jack-up force $W_U$ acting on the outside wheels during turning is increased to cause the vehicle body to rise, thereby increasing height of the center of gravity of the vehicle body according to increase in lateral acceleration acting on the vehicle body.

Figure 11:
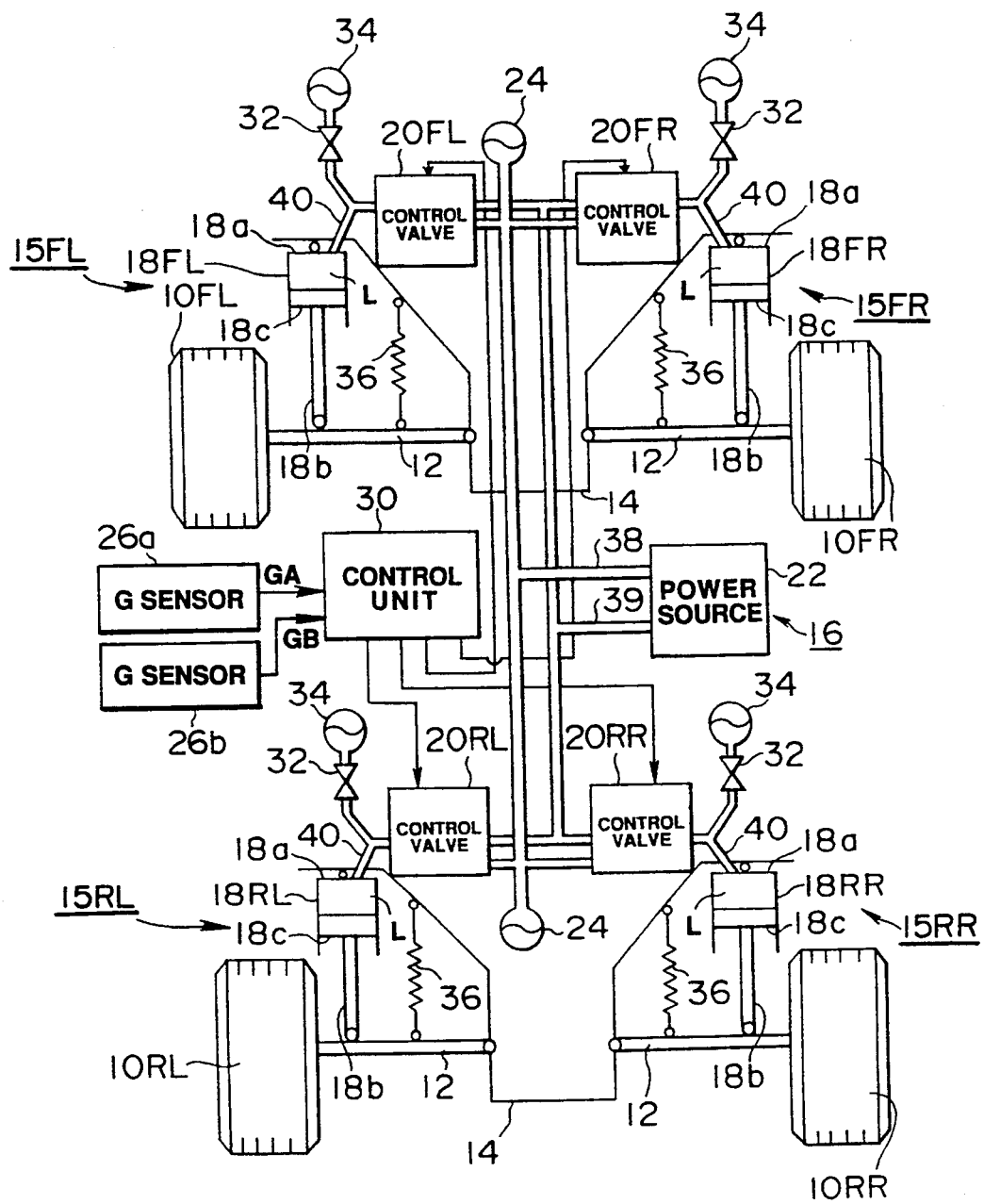
FIG. 11 is a schematic view which shows an laternative active suspension system according to the present invention.

Referring to FIG. 11, an alternative active suspension system according to the present invention is shown. As discussed above, the magnitude of jack-up forces created at front and rear wheels depend on lateral accelerations acting on the front and rear wheels respectively. Accordingly, the active suspension system as discussed below serves to determine lateral accelerations acting on the front and rear wheels separately to control neutral pressures supplied to front and rear hydraulic cylinders independently to suppress jack-up forces completely in a transitional status during turning where different lateral accelerations act on the front and rear wheels.

The shown active suspension system is different from the above mentioned first embodiment in that two sensors, or front and rear lateral acceleration sensors 26a and 26b are provided. Other arrangements are similar to the first embodiment, therefore, explanation thereof in detail will be omitted here.

The front lateral acceleration sensor 26a is mounted on a preselected portion of a vehicle body 14 which is located frontward from the center of gravity of the vehicle body by a predetermined distance $L_A$, for example, it may be installed on a portion adjacent a front axle and serves to detect lateral acceleration acting on a front side of the vehicle body to provide a signal representing a lateral acceleration detected value $G_A$ to a control unit 30. The rear lateral acceleration sensor 26b is mounted on a preselected portion of the vehicle body 14 which is situated rearward from the center of gravity by a predetermined distance $L_B$, for example, it may be installed on a portion adjacent a rear axle and serves to detect lateral acceleration acting on a rear side of the vehicle body to provide a signal indicative of a lateral acceleration detected value $G_B$ to the control unit.

Figure 12:
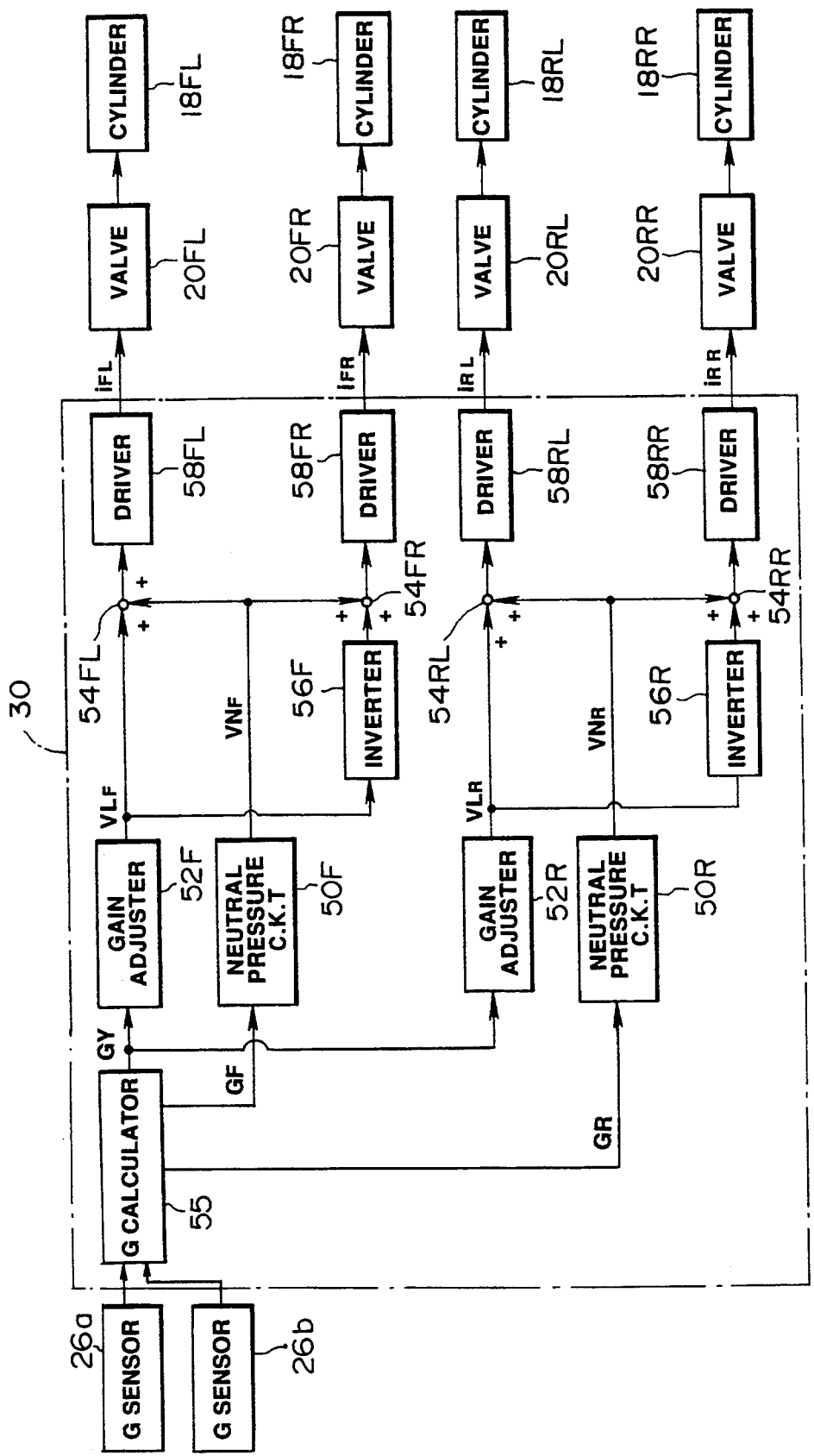
FIG. 12 is a block diagram which shows a control unit of an active suspension system in FIG. 11.

Referring to FIG. 12, the control unit 30 of the above alternative embodiment is shown. The control unit 30 includes a lateral acceleration determining circuit 55 (G calculator). The lateral acceleration determining circuit 55 is responsive to the signals from the front and rear lateral acceleration sensors 26a and 26b to determine a lateral acceleration value $G_Y$ indicative of the magnitude of lateral acceleration acting on the center of gravity of the vehicle body, a lateral acceleration value $G_F$ indicative of the magnitude of lateral acceleration acting on a front wheel axle shaft, and a lateral acceleration value $G_R$ indicative of the magnitude of lateral acceleration acting on a rear wheel axle shaft. The lateral acceleration determining circuit 55 then outputs a signal indicating the lateral acceleration value $G_Y$ to front and rear varlably adjusting gain circuits 52F and 52R, a signal indicating the lateral acceleration value $G_F$ to a neutral pressure setting circuit 50F, and a signal indicating the lateral acceleration value $G_R$ to a neutral pressure setting circuit 50R respectively.

The lateral acceleration determining circuit 55 projects the lateral acceleration values $G_F$, $G_R$, and $G_Y$ with the following equations based on the lateral acceleration detected values $G_A$ and $G_B$ input thereto.

$$G_F = \{(L_B - L_F)/(L_B - L_A)\}G_A - \{(L_A - L_F) - (L_B - L_A)\}G_B$$

$$G_R = \{(L_B - L_R)/(L_B - L_A)\}G_A - \{(L_A - L_R) - (L_B - L_A)\}G_B$$

$$G_Y = (L_B \cdot G_A + L_A \cdot G_B)/(L_B - L_A)$$

where $L_A$ is a distance between the center of gravity of a vehicle body and a position where the front lateral acceleration sensor 26a is mounted, $L_B$ is a distance between the center of gravity and a position where the rear lateral acceleration sensor 26b is mounted, $L_F$ is a distance between the center of gravity and a front axle and $L_R$ is a distance between the center of gravity and a rear axle.

The above equations are derived by the following relations; a position in front of the center of gravity of a vehicle body is positive, a position rearward of the vehicle center of gravity is negative, and $\dot{\phi}$ is a yaw rate.

$$G_A = G_Y + L_A \dot{\phi} \quad (1)$$

$$G_B = G_Y + L_B \dot{\phi} \quad (2)$$

from $(1) \times L_B - (2) \times L_A$ $$L_B G_A - L_A G_B = (L_B - L_A) G_Y \text{ thus,}$$
$$G_Y = \{1/(L_B - L_A)\}(L_B \cdot G_A - L_A \cdot G_B) \quad (3)$$

from $(1) - (2)$ $$G_A - G_B = (L_A - L_B) \dot{\phi} \text{ thus,}$$
$$\dot{\phi} = \{1/(L_A - L_B)\}(G_A - G_B) \quad (4)$$

$$G_F = G_Y + L_F \dot{\phi}$$

$$G_R = G_Y + L_R \dot{\phi}$$

substituting (3) and (4) for the above equations, $$\begin{aligned}G_F &= \{1/(L_B - L_A)\}(L_B \cdot G_A - L_A \cdot G_B) + \\ &\quad L_F\{1/(L_A - L_B)\}(G_A - G_B) \\ &= \{(L_B - L_F)/(L_B - L_A)\}G_A - \\ &\quad \{(L_A - L_F) - (L_B - L_A)\}G_B\end{aligned}$$

$$\begin{aligned}G_R &= \{1/(L_B - L_A)\}(L_B \cdot G_A - L_A \cdot G_B) + \\ &\quad L_R\{1/(L_A - L_B)\}(G_A - G_B) \\ &= \{(L_B - L_R)/(L_B - L_A)\}G_A - \\ &\quad \{(L_A - L_R) - (L_B - L_A)\}G_B\end{aligned}$$

The lateral acceleration value $G_Y$ may be lateral acceleration at a portion other than the center of gravity of the vehicle body.

The varlably adjusting gain circuits 52F and 52R are responsive to the signal indicating the lateral acceleration value $G_Y$ to provide anti-rolling command values $VL_F$ and $VL_R$ respectively in the same manner as described in the first embodiment. The neutral pressure setting circuits 50F and 50R are also responsive to the signals indicative of the lateral acceleration values $G_F$ and $G_R$ to provide neutral pressure command values $VN_F$ and $VN_R$.

With the above arrangement, it will be noted that the varlably adjusting gain circuits 52F and 52R serve to provide anti-rolling moment through the front and rear hydraulic cylinders 18FL to 18RR based on lateral acceleration acting on the center of gravity of a vehicle body, the neutral pressure setting circuits 50F and 50R serve to reduce neutral pressures supplied to the front and rear hydraulic cylinders closely as lateral accelerations acting on front and rear axles increase respectively. Consequently, even when lateral acceleration acting on the front and rear axles are different from each other in a transitional status during turning, the front and rear jack-up forces $W_U$ are compensated effectively, thereby maintaining the vehicle body at a predetermined constant height level over turns.

In the above embodiment, the two lateral acceleration sensors 26a and 26b are arranged longitudinally away from each other by a preselected distance for projecting lateral accelerations acting on the front and rear axles based on detected acceleration values respectively. However, other suitable measuring means, for example, one lateral acceleration sensor and one yaw rate sensor may be utilized to determine lateral accelerations acting on the front and rear axles. Additionally, the pressure control valves 20FL to 20RR may be replaced with a flow control valve which is operable to effect feedback-control of pressure in the hydraulic cylinder.

Further, the above system of the present invention provides the anti-rolling control gain $K_F$ for front suspension units greater than the anti-rolling control gain $K_R$ for rear suspension units to establish understeering characteristics, however, the anti-rolling control gains $K_F$ and $K_R$ may be changed based on desired steering characteristics. For example, a manual gain selector may be arranged adjacent a driver which serves to vary the anti-rolling control gains to values of interest to the driver.

Additionally, the jack-up force $W_U$ acting on the outside wheels during turning is determined dependent upon an amount of lateral load displacement between the outside and inside wheels and the geometry of a suspension link system, therefore, it is necessary to define characteristics, i.e., the magnitude or variation of the neutral pressure command values $VN_F$ and $VN_R$ provided by the neutral pressure setting circuits 50F and 50R separately for the front and rear suspension units according to the anti-rolling control gains and/or a type of suspension. For example, if the anti-rolling control gain $K_F$ for the front suspension units is set to a greater value, increasing variation in the neutral pressure command value $VN_F$ according to lateral acceleration is advantageously preferable.

What is claimed is:

1. A method for actively controlling vehicular active suspension units, said active suspension units being disposed between a vehicle body and respective front left, front right, rear left, and rear right tire wheels, comprising steps of:
   a) monitoring a magnitude and direction of a lateral acceleration acted upon a vehicle body;
   b) providing neutral pressure command values $VN_F$ and $VN_R$ having voltages varied according to the monitored magnitude and direction of the lateral acceleration, said neutral pressure command values being decreased as the magnitude of the lateral acceleration is increased;
   c) providing gain adjusted values $VL_F$ and $VL_R$ of anti-rolling command values according to the magnitude and direction of the lateral acceleration, said gains $K_F$ and a rear tire wheel side anti-roll control gain $K_R$ and said anti-rolling command values being multiplication of both the corresponding anti-roll gain and magnitude and direction of the lateral acceleration;
   d) adding the neutral pressure command values $VN_F$ and $VN_R$ to anti-rolling command values $VL_F$ and $VL_R$ to provide the added values to driving circuits for front left and rear left suspension units, respectively, and adding the neutral pressure command values $VN_F$ and $VN_R$ to inverted values of anti-rolling command values $VL_F$ and $VL_R$ to provide the added values to driving circuits for front right and rear right suspension units, respectively; and
   e) converting the added values into respective energizing currents $i_{FL}$, $i_{FR}$, $i_{RL}$, and $i_{RR}$, respectively, to be input to respective pressure control valves of the front left, front right, rear left and rear right suspension units so that the anti-roll and jacking up suppression controls are carried out for the respective suspension units.

2. A method for actively controlling vehicular suspension units as set forth in claim 1, wherein a total gain of both anti-roll gains ($K=K_F+K_R$) is set such that a rolling motion generated when the lateral acceleration acted upon the vehicle body gives approximately zero.

3. A method for actively controlling vehicular suspension units as set forth in claim 2, wherein $K_F > K_R$.

4. A method for actively controlling vehicular suspension units as set forth in claim 3, wherein each of the neutral command values $VN_F$ and $VN_R$ are such that a positive predetermined value $VN_0$ to receive a burden of a part of a static weight of the vehicle body is given thereto when the monitored lateral acceleration indicates approximately zero and a gradually decreased value $VN_F$ or $VN_R$ is given when the monitored lateral acceleration G is increased in the direction of either plus or minus.

5. A method for actively controlling vehicular suspension units as set forth in claim 4, wherein a rate of decrease in the one neutral command value $VN_F$ is smaller than that in the other neutral command value $VN_R$.

6. A method for actively controlling vehicular suspension units as set forth in claim 5, wherein each of said pressure control valves comprises a proportional solenoid valve.

7. A method for actively controlling vehicular suspension units as set forth in claim 1, wherein said step a) monitors the lateral accelerations acted upon vehicular front and rear axles of the vehicle body.

8. A method for actively controlling vehicular suspension units as set forth in claim 7, wherein said step a) further comprises a step f) calculating one lateral acceleration $G_F$ acted upon the vehicular front axle and g) calculating another lateral acceleration $G_R$ acted upon the vehicular rear axle, the magnitude and direction of the one lateral acceleration $G_F$ being provided for the neutral command values $VN_F$ for the front suspension units and those of the other lateral acceleration $G_R$ being provided for the neutral command values $VN_R$.

* * * * *

UNITED STATES PATENT AND TRADEMARK OFFICE
CERTIFICATE OF CORRECTION

PATENT NO. : 5,396,423  
DATED : March 7, 1995  
INVENTOR(S) : Itaru Fujimura et al.

It is certified that error appears in the above-indentified patent and that said Letters Patent is hereby corrected as shown below:

On the title page, item [21] should read as follows:

--[21] Appl. No.: 822,274--

Signed and Sealed this

Eleventh Day of July, 1995

BRUCE LEHMAN

Attest:

Attesting Officer

Commissioner of Patents and Trademarks